H. A. RHODES.
ELECTRIC MOTOR.
APPLICATION FILED SEPT. 13, 1909. RENEWED DEC. 13, 1912.
1,068,531.  Patented July 29, 1913.
3 SHEETS—SHEET 1.
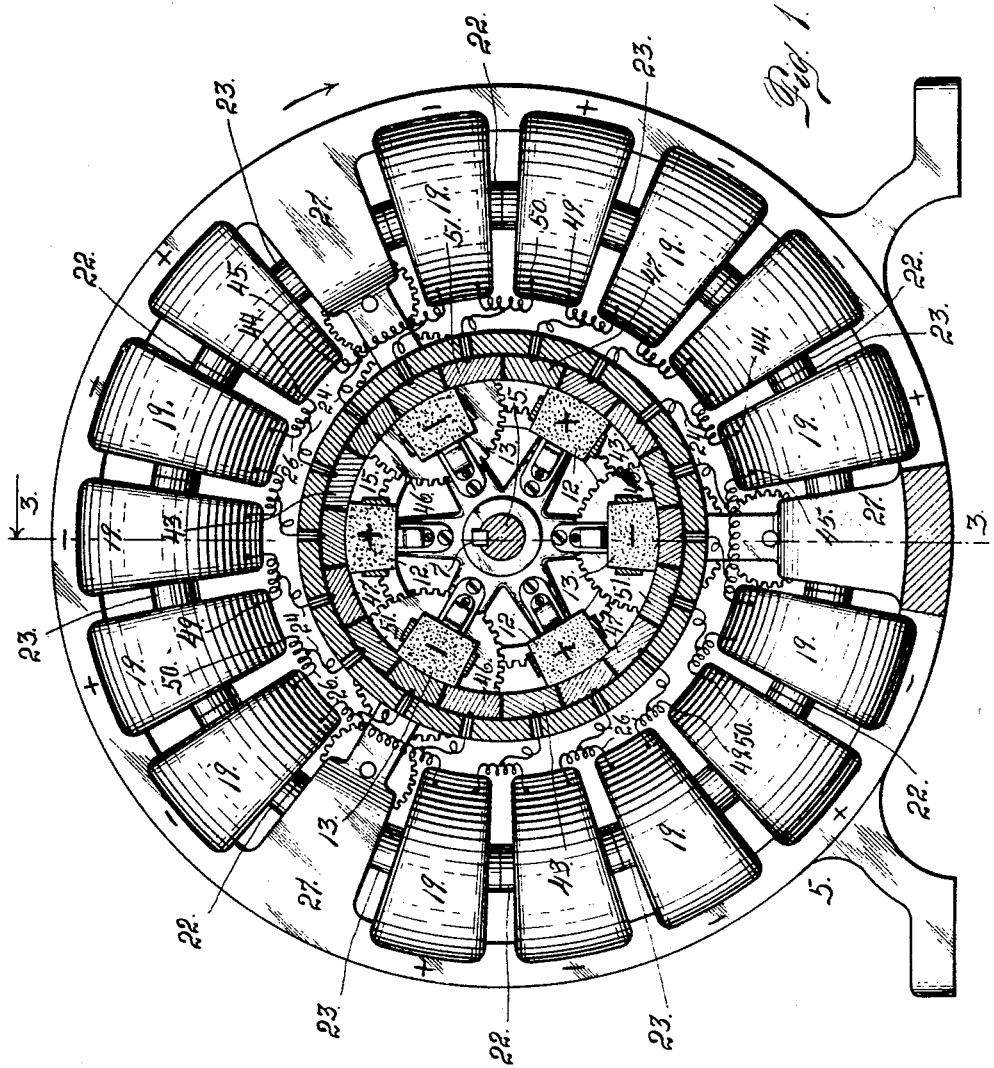

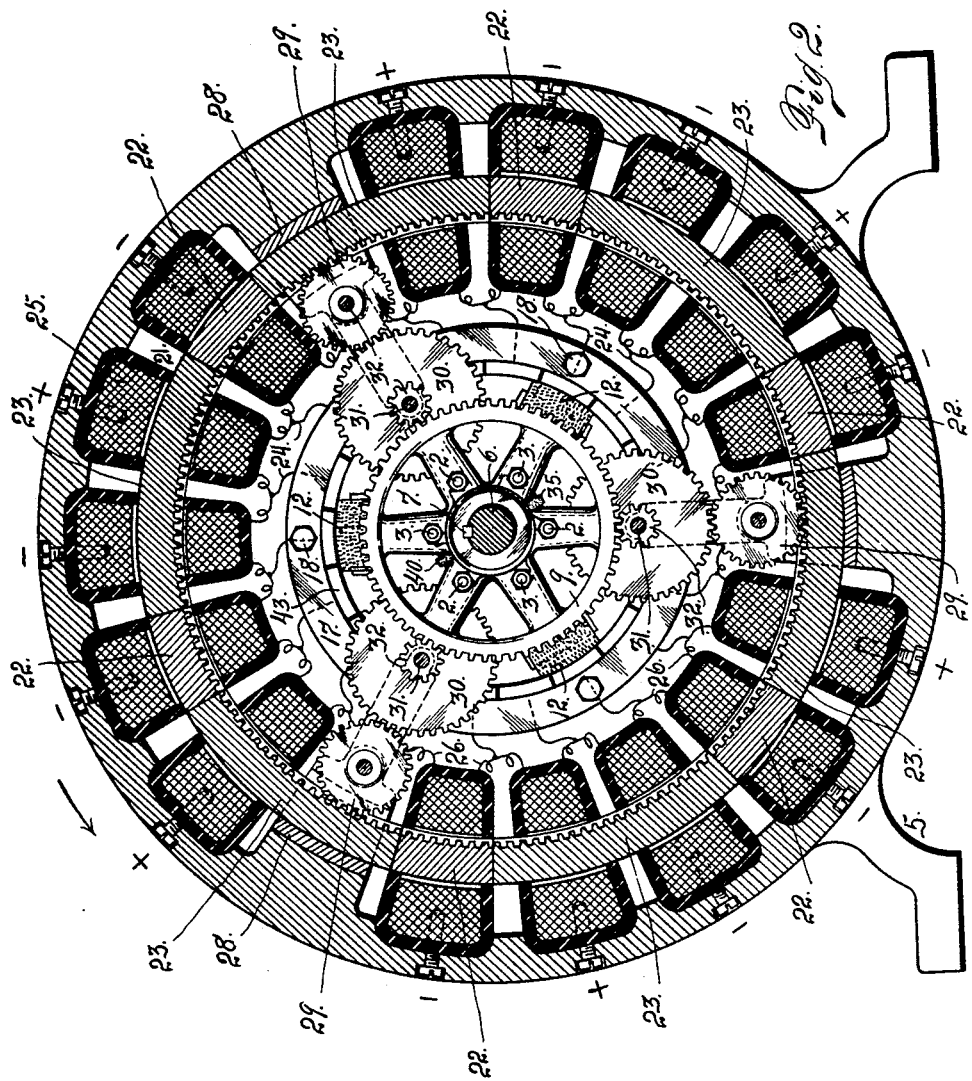

H. A. RHODES.
ELECTRIC MOTOR.
APPLICATION FILED SEPT. 13, 1909. RENEWED DEC. 13, 1912.
1,068,531.
Patented July 29, 1913.
3 SHEETS—SHEET 3.
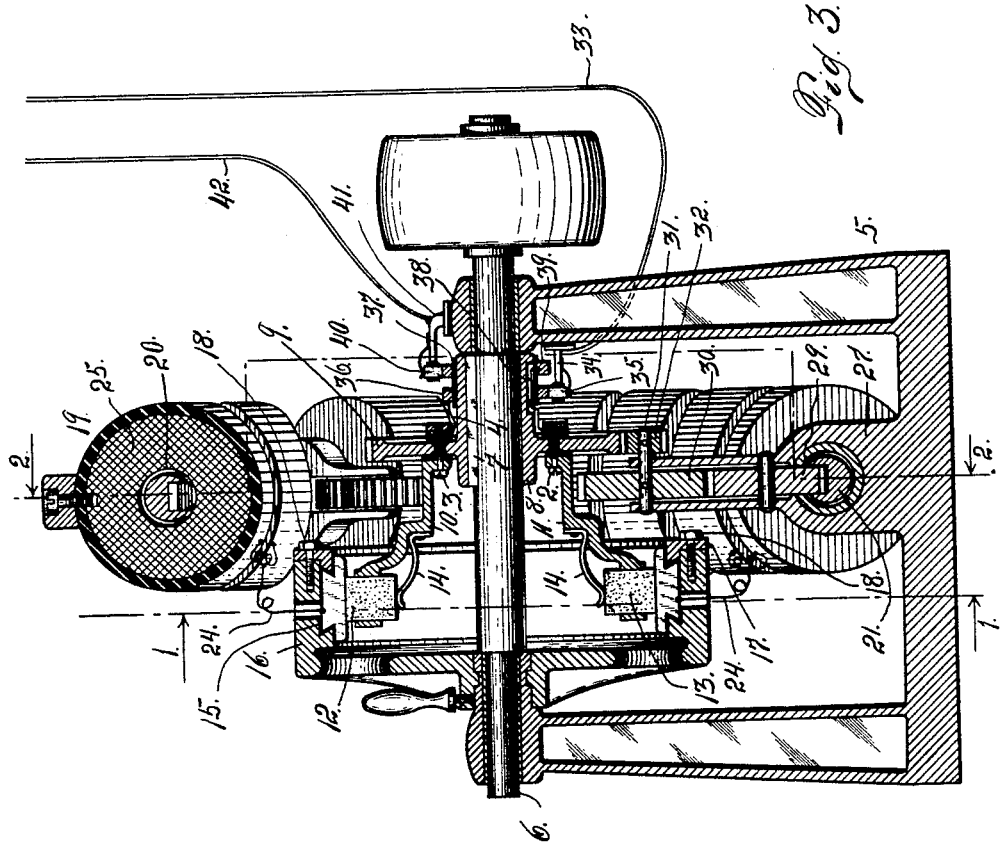
Witnesses
Otto E. Hoddick.
J. D. Thornburgh.
Inventor
Harry A. Rhodes.
By A. J. O'Brien.
Attorney

UNITED STATES PATENT OFFICE.

HARRY A. RHODES, OF DENVER, COLORADO, ASSIGNOR TO THE UNIVERSAL MOTOR COMPANY, OF DENVER, COLORADO, A CORPORATION OF ARIZONA.

ELECTRIC MOTOR.

1,068,531.      Specification of Letters Patent.      Patented July 29, 1913.

Application filed September 13, 1909, Serial No. 517,469. Renewed December 13, 1912. Serial No. 736,612.

*To all whom it may concern:*

Be it known that I, HARRY A. RHODES, a citizen of the United States, residing in the city and county of Denver and State of Colorado, have invented certain new and useful Improvements in Electric Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in electric motors.

In order to simplify the windings of electrical motors, I have designed an electromagnetic motor based on the principle of a solenoid magnet.

The stationary part of my motor consists of a series of ironclad solenoids connected in series through a commutator; the armature or core represents a ring built together of iron pieces or segments of the same length as the solenoids, with non-magnetic metal members between them, and forming a part of the ring. The brushes on the commutator are arranged in such a manner as to short-circuit some solenoids and have the rest working, that is, energized and pulling the iron cores into them. This act of course will result in a circular movement of the armature ring, which ring is held in place by three bearings arranged symmetrically. The power itself is taken off by a number of gears and transmitted to the shaft.

Having briefly outlined my improved construction, I will proceed to describe the same in detail, reference being made to the accompanying drawing, in which is illustrated an embodiment thereof.

In this drawing: Figure 1 is a side view of my improved motor, partly in elevation and partly in section. The section is taken on the line 1—1, Fig. 3, looking toward the right, or in the direction of the arrow. Fig. 2 is, for the most part, a central, vertical section taken on the line 2—2, Fig. 3. In this view, however, some of the elements to the right of the line 2—2, are shown in elevation. Fig. 3 is a section taken approximately on the line 3—3, Fig. 1.

The same reference characters indicate the same parts in all the views.

Let the numeral 5 designate a suitable supporting-frame in which is journaled the shaft 6, to which is secured by a key 7, the hub 8, of a gear 9. To this gear are secured angular arms 10, carrying a number of positive brushes 12, and similar arms 11, carrying a corresponding number of negative brushes 13. As shown in the drawing, three positive and three negative brushes are employed. Each brush is engaged by a spring 14, which presses it against the commutator 15, composed of a series of segments which are retained in place by a surrounding ring or band 16, in which the commutator segments are dovetailed. On one side of the band 16, a retaining-plate 17 is secured by bolts 18.

The outer portion of the motor is composed of a series of solenoids 19, whose coils 25 surround openings 20, through which a gear 21 is adapted to pass, this gear being composed of a series of iron segments 22, and interposed segments 23, composed of non-magnetic material.

The current for supplying the motor enters the same through the positive brushes 12, which are connected with one pole of the generator, or source of supply (not shown); and escapes through the negative brushes 13 which are connected with the opposite pole of the generator.

The current passes from the brushes to the segments of the commutator and from the latter through wires 24 and branch wires 26, to the coils 25 of the solenoid. It will be noted that the various segments of the core gear 21, are loosely mounted in the coils of the solenoids so that the latter are subjected to no wear during the operation of the gear. The gear, however, engages three bearings 27 equidistantly arranged, these bearing members being provided with openings in which bushings 28 are located. The inner edge of the gear is toothed or cogged and engages smaller gears 29, which are journaled in the bearing members 27. During the rotation of the gear 21, motion is transmitted first to the gears 29, from them in turn to gears 30, upon whose shafts 31, are mounted pinions 32, which engage the relatively large gear 9, keyed to the shaft 6 of the motor, as heretofore explained. This gearing connection between the large gear 21 and the shaft, must be such that the gear 9 is rotated at such a speed, as to cause the brushes 12 and 13 to constantly maintain certain predetermined positions with reference to the solenoids during the operation of the motor, and this must be understood in considering this specification.

The current for supplying the motor enters the same through a conductor 33, which leads to an arm 34, carrying a brush 35, engaging a collector ring 36, mounted on the hub 8, but insulated therefrom, as shown at 37. The current passes thence from the ring 36, through the core 4 and the screws 3, to the arms 10, carrying the positive brushes 12, as heretofore explained, and thence to the commutator segments, and passes out of the motor, from the commutator segments, through the negative brushes 13, the angular arms 11, wires or a conductor 38, a ring 39, a brush 40, an arm 41, and a conductor 42.

In describing the operation of the motor, the current may be said to pass from any positive brush 12, through a commutator segment 43, a wire 24, and a branch wire 26, to the terminal 44 of the coils 25, of a solenoid marked plus (+), thence through the said coils to the opposite terminal 45, thence from a branch wire 26, and a wire 24 to a segment 46 of the armature, and thence to a negative brush 13. In this manner the solenoid is energized and an iron segment 22 drawn from a solenoid marked minus (—) into the energized solenoid, thus imparting movement to the gear 21 in the direction of the arrow in Fig. 1. At the same time the current passes from the same brush 12 through a commutator segment 47, a wire 24, a branch wire 26, to a terminal 49 of the coils 25 of another solenoid marked plus (+), through the coils of the said solenoid to the opposite terminal 50, thence through a branch wire 26, and a wire 24, to a segment 51, of the commutator, and thence to another negative brush 13, and out of the motor. During this time this second plus (+) solenoid is energized and another segment 22, of the gear is drawn thereinto, thus aiding in the rotation of the gear. As there are three positive brushes, six solenoids are simultaneously energized and coöperate to impart motion to the gear in the same direction. During the same time, a number of solenoids marked minus (—) are short-circuited, since the current in passing from any positive brush will take the shortest path to the negative brush. Hence, referring to the upper part of Fig. 1, the two solenoids marked with the minus (—) sign are short-circuited; while the two plus (+) solenoids on opposite sides thereof are energized.

Having thus described my invention, what I claim is:

1. An electric motor, comprising a series of solenoids arranged in circular form and whose cores constitute segments of a gear, the said segments being composed of magnetic material, the gear also having non-magnetic members interposed between the magnetic segments, a stationary commutator, an electrical connection between the segments of the commutator and the coils of the solenoids, a gear wheel mounted on the motor shaft, and a connection between the solenoid gear and the motor shaft gear, positive and negative brushes engaging the segments of the commutator and actuated by the motor shaft gear, the arrangement being such that the solenoids are successively energized in such positions as to act on the magnetic members of the solenoid gear to produce rotary movement, the brushes being rotated in harmony therewith, substantially as described.

2. An electric motor, comprising a series of solenoids arranged in circular form and having iron cores forming parts of a segmental gear, the balance of the gear being composed of non-magnetic members interposed between the cores of the solenoids, a gear wheel carried by the motor shaft, an operative connection between the said gear and the solenoid gear, positive and negative brushes mounted on the motor shaft gear and adapted to rotate therewith, whereby as the gear is actuated the brushes are rotated in harmony therewith, a stationary commutator electrically connected with the brushes and with the coils of the various solenoids, the arrangement of the parts being such that the solenoids are successively energized, a predetermined number of the solenoids being simultaneously energized, while others of the solenoids are deënergized, the arrangement of the energized and deënergized solenoids being such that the energized solenoids coöperate to rotate the solenoid gear by acting upon the magnetic members thereof, substantially as described.

3. An electric motor composed of a number of solenoids having cores composed of magnetic material, the said cores forming segments of a gear, the balance of the gear being composed of non-magnetic members interposed between the magnetic members, a second gear mounted on the motor shaft, and concentrically arranged within the solenoid gear, brushes mounted on the second gear, a commutator electrically connected with the solenoids, the said commutator being engaged by the said brushes, an operative connection between the solenoid gear and the motor shaft gear, whereby motion is imparted to the motor shaft by the solenoid gear, the construction and arrangement of the members being such that certain of the solenoids located at predetermined intervals around the solenoid gear are simultaneously energized and act upon the magnetic members of the gear to rotate the latter, substantially as described.

In testimony whereof I affix my signature in presence of two witnesses.

HARRY A. RHODES.

Witnesses:
A. J. O'BRIEN,
M. F. MANEY.

Copies of this patent may be obtained for five cents each, by addressing the "Commissioner of Patents, Washington, D. C."